(12) United States Patent
Klimack et al.

(10) Patent No.: US 11,994,007 B2
(45) Date of Patent: May 28, 2024

(54) FLOW CONTROL NOZZLES, METHOD OF MANUFACTURE AND USE THEREOF

(71) Applicant: KLIMACK HOLDINGS INC., Beaver County (CA)

(72) Inventors: Brian Kenneth Klimack, Beaver County (CA); Trevor Nicholas Stanley Lisowski, Beaver County (CA); Jesse Kenneth Edward Klimack, Beaver County (CA)

(73) Assignee: KLIMACK HOLDINGS INC., Beaver County (CA)

( * ) Notice: Subject to any disclaimer, the term of this patent is extended or adjusted under 35 U.S.C. 154(b) by 21 days.

(21) Appl. No.: 17/951,908

(22) Filed: Sep. 23, 2022

(65) Prior Publication Data
US 2023/0100622 A1 Mar. 30, 2023

Related U.S. Application Data

(60) Provisional application No. 63/250,054, filed on Sep. 29, 2021.

(51) Int. Cl.
*E21B 41/00* (2006.01)
*E21B 43/12* (2006.01)
*E21B 43/24* (2006.01)
*F16L 9/19* (2006.01)

(52) U.S. Cl.
CPC .......... *E21B 41/0078* (2013.01); *E21B 43/12* (2013.01); *E21B 43/2406* (2013.01); *F16L 9/19* (2013.01)

(58) Field of Classification Search
CPC .. E21B 41/0078; E21B 43/12; E21B 43/2406; F16L 9/19
See application file for complete search history.

(56) References Cited

U.S. PATENT DOCUMENTS

| | | | |
|---|---|---|---|
| 6,708,763 B2 * | 3/2004 | Howard | E21B 41/0078 166/269 |
| 11,519,250 B2 * | 12/2022 | Zhu | E21B 41/0078 |
| 2016/0010425 A1 * | 1/2016 | Dyck | E21B 43/12 166/380 |

(Continued)

FOREIGN PATENT DOCUMENTS

| CA | 2871354 C | 10/2015 |
|---|---|---|
| CA | 2794539 C | 2/2016 |

(Continued)

*Primary Examiner* — Daniel P Stephenson
(74) *Attorney, Agent, or Firm* — FIELD LLP

(57) ABSTRACT

An inflow control nozzle is provided for use with a tubing. The nozzle includes a one-piece, 3D printed body, the body including a fluid inlet in communication with an outside of the tubing said inlet having an oval cross section; a fluid outlet in communication with an inside of the tubing; and an inner bore connecting the fluid inlet to the fluid outlet, said inner bore including a venturi restriction. The inner bore comprises a flared profile from the fluid inlet to the venturi restriction, and a flared and curved profile from the venturi restriction to the fluid outlet, said curved profile being free of angular bends or sharp direction change. An outflow control nozzle is also provided for use with a tubing and an inflow-outflow control nozzle is further provided for use with a casing.

6 Claims, 11 Drawing Sheets

(56) References Cited

U.S. PATENT DOCUMENTS

| | | | | |
|---|---|---|---|---|
| 2019/0178068 A1* | 6/2019 | Stolboushkin | .......... | E21B 43/12 |
| 2020/0256163 A1* | 8/2020 | Fermaniuk | .......... | E21B 41/0078 |
| 2021/0254435 A1* | 8/2021 | Zhu | .......... | E21B 43/12 |
| 2023/0100622 A1* | 3/2023 | Klimack | .......... | E21B 41/0078 |
| | | | | 166/222 |

FOREIGN PATENT DOCUMENTS

| | | | |
|---|---|---|---|
| CA | 3074488 A1 | | 3/2019 |
| CN | 109973021 B | * | 9/2020 |
| WO | WO-2022155739 A1 | * | 7/2022 |

* cited by examiner

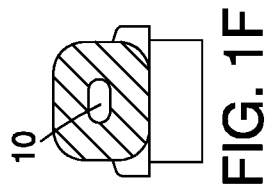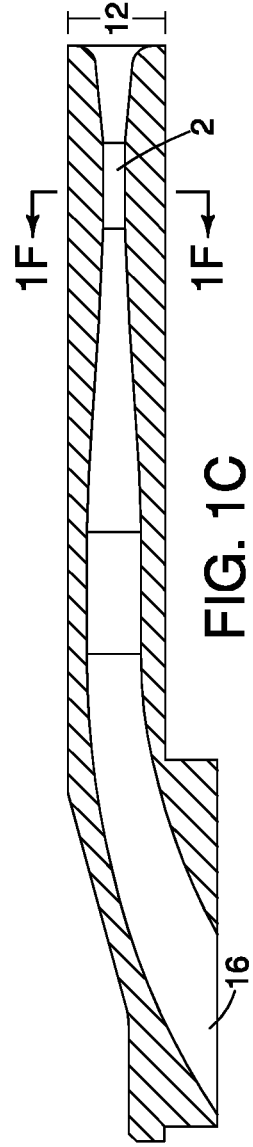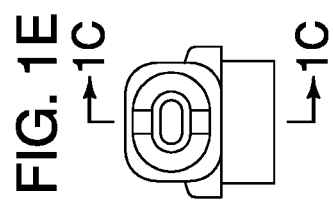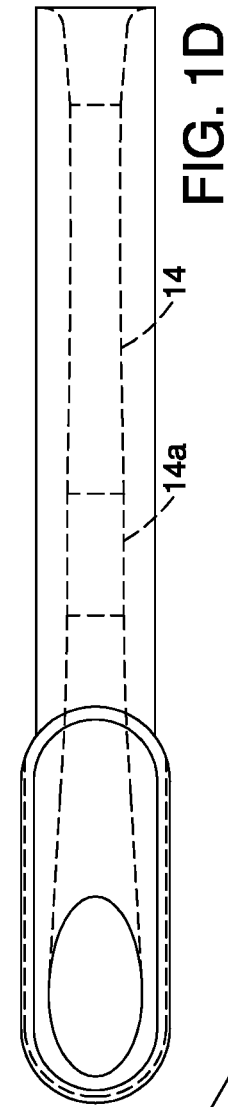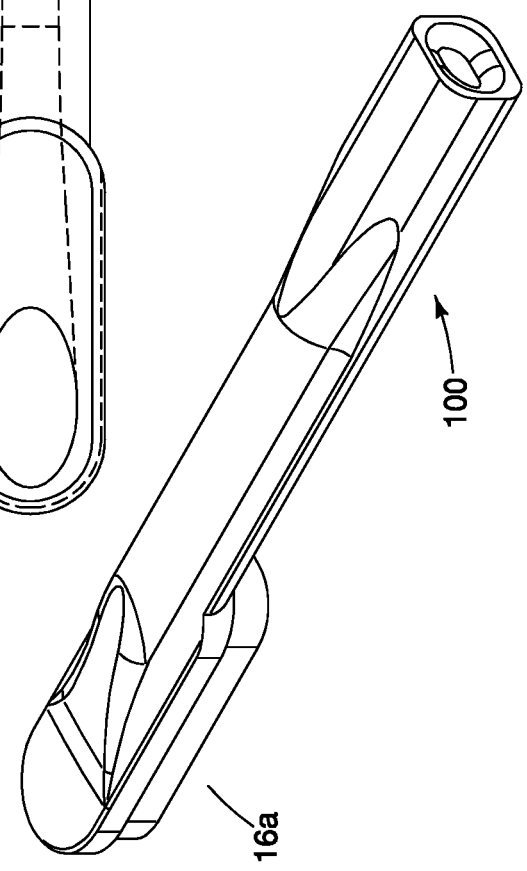

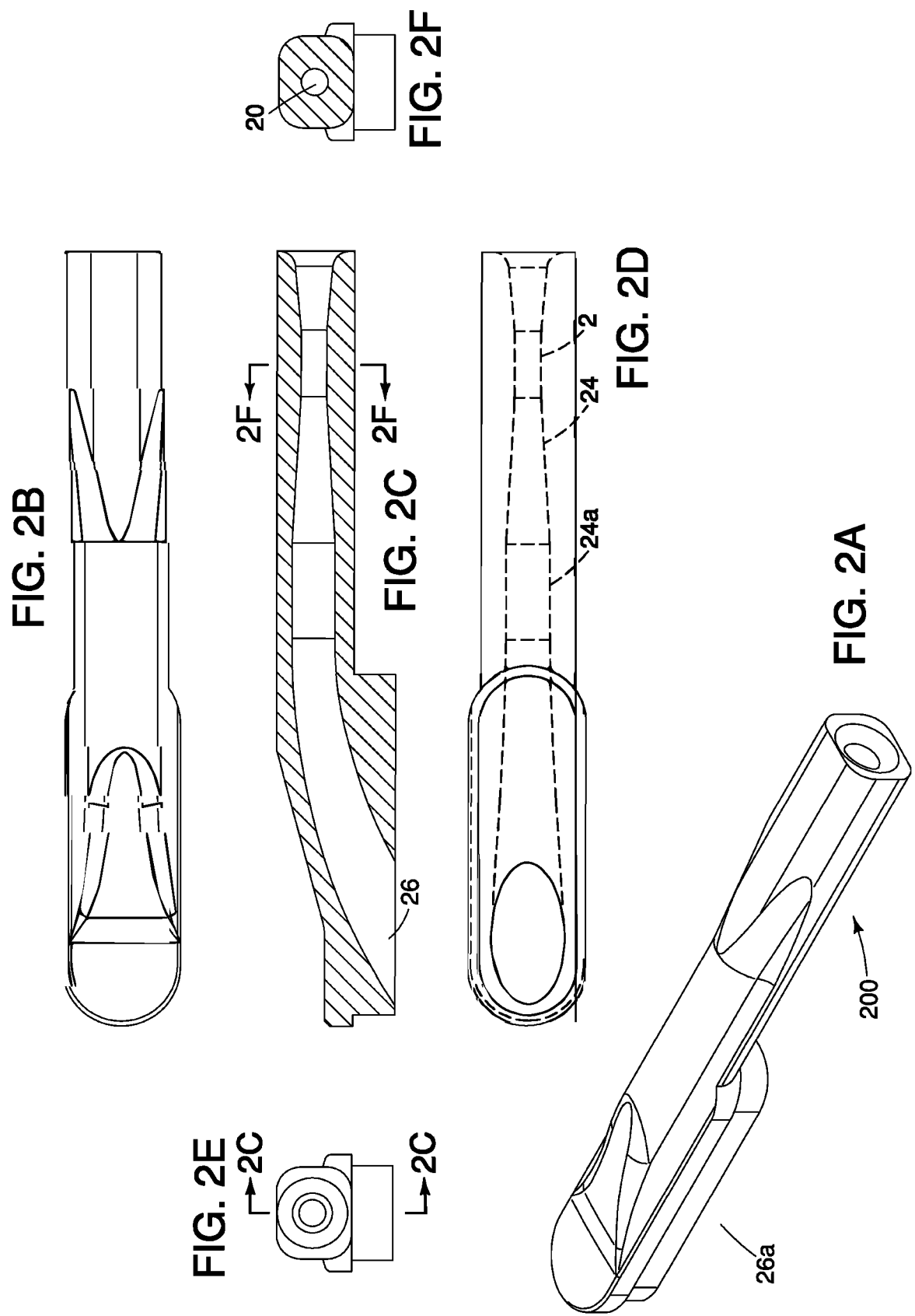

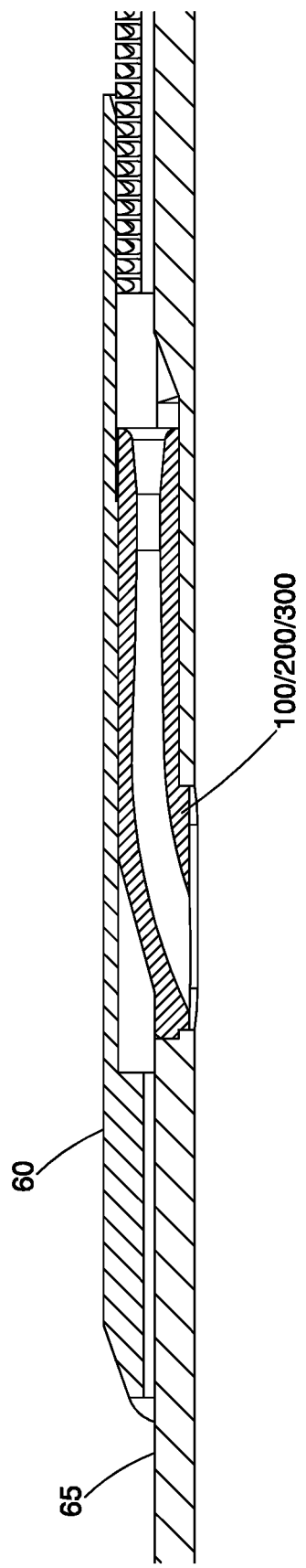

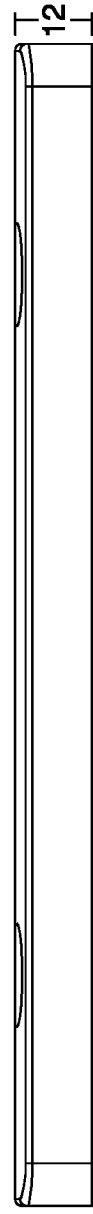
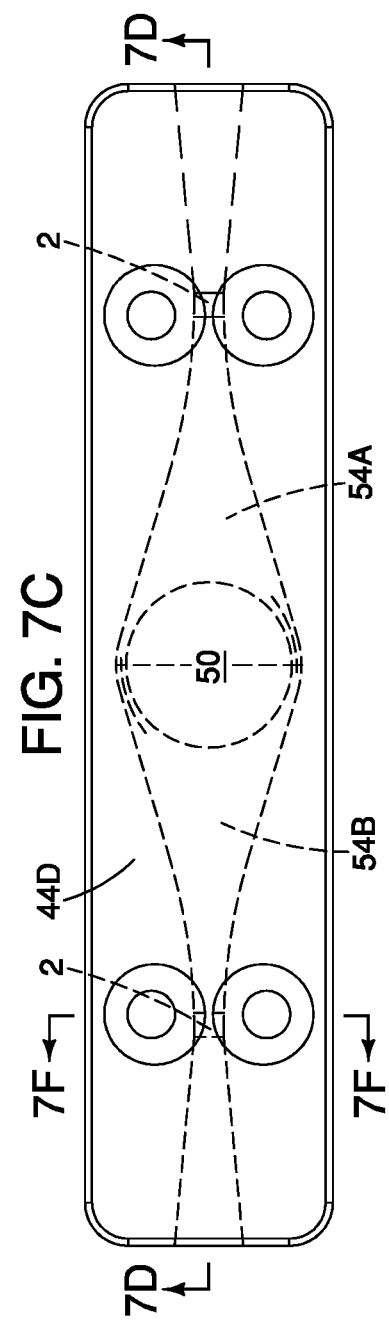
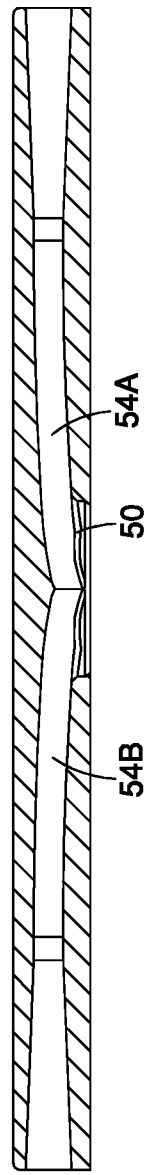
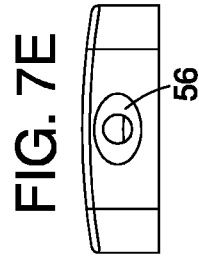
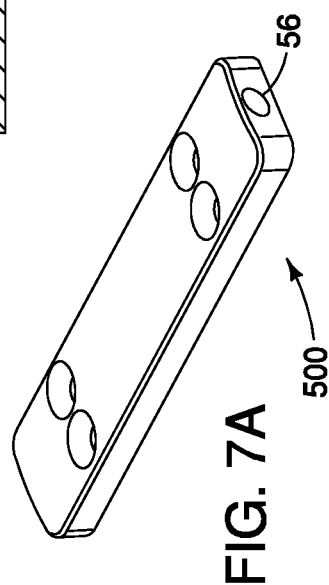

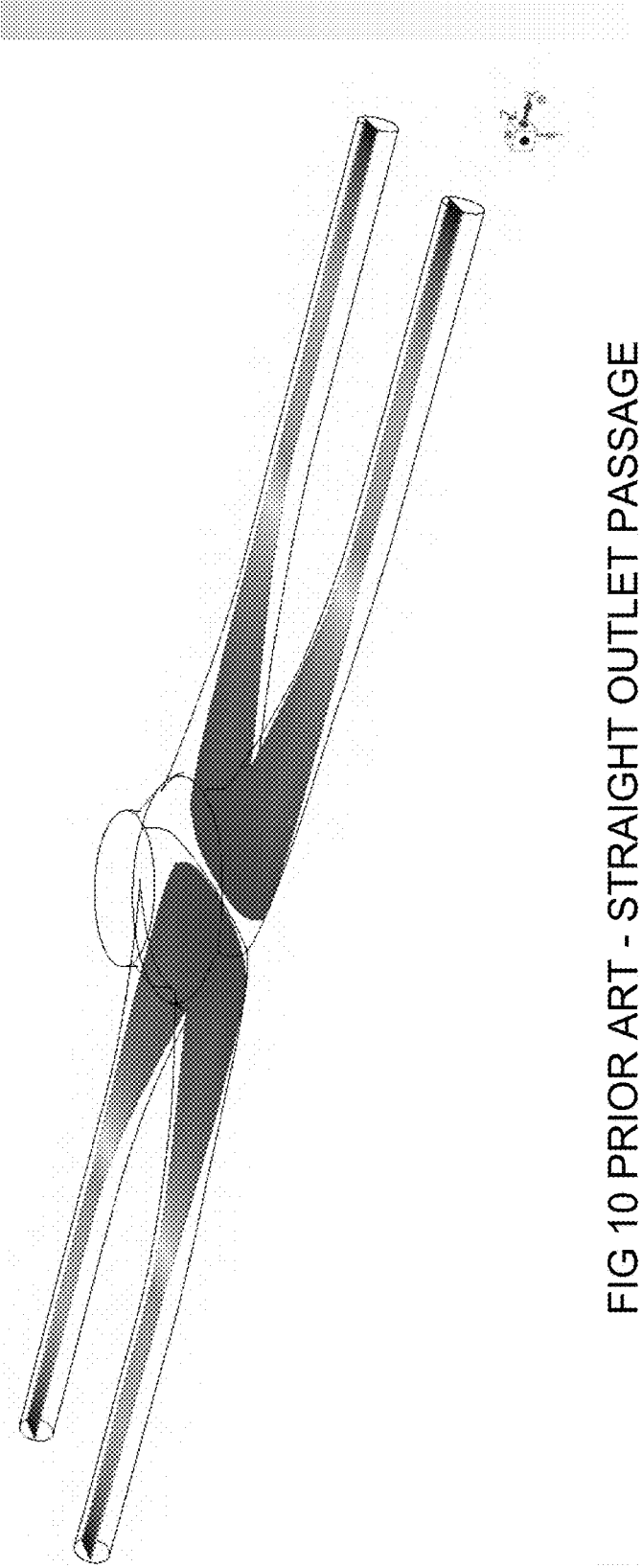
FIG 10 PRIOR ART - STRAIGHT OUTLET PASSAGE

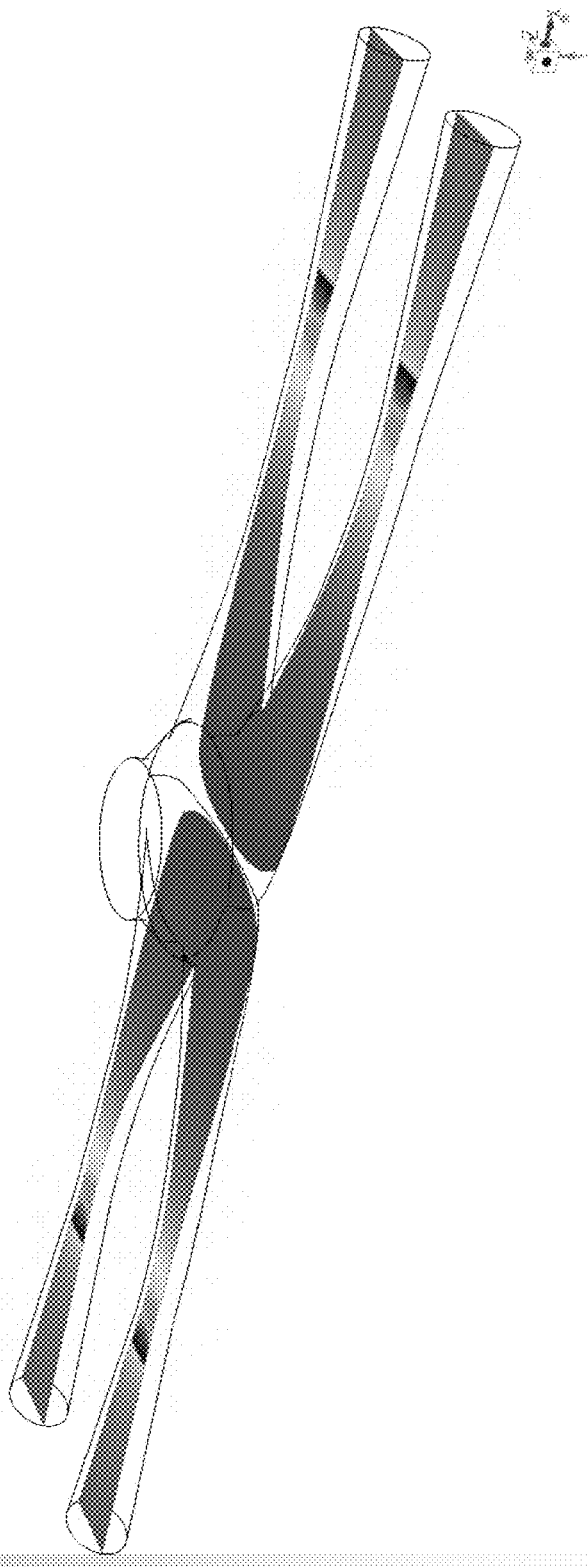
FIG 11 - FLARED OUTLET PASSAGE

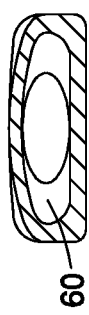
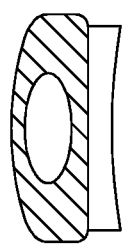
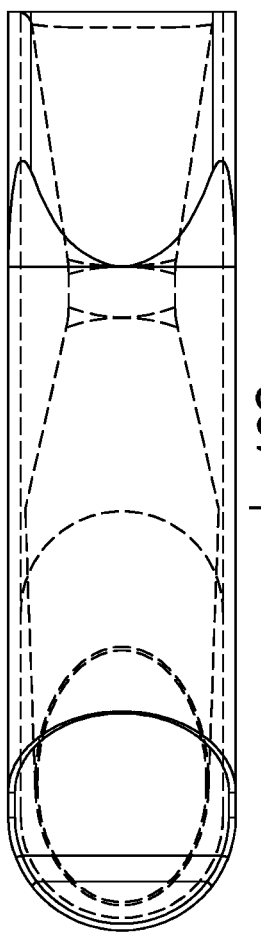
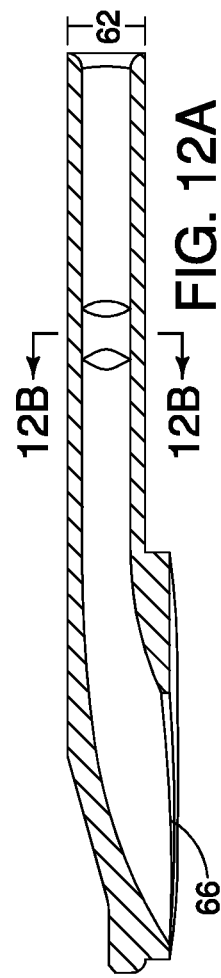
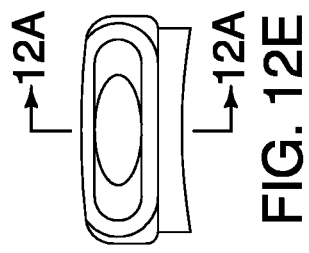
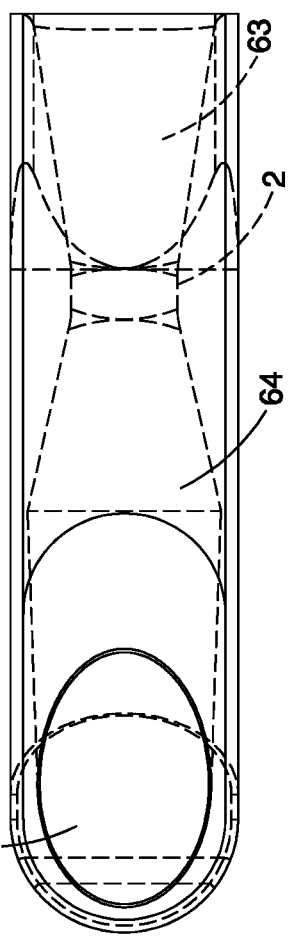
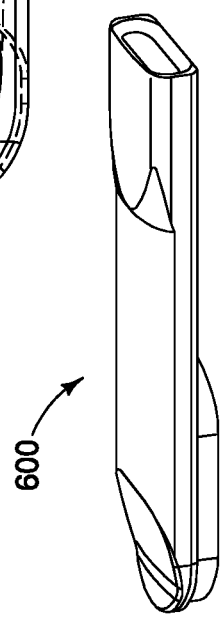

FLOW CONTROL NOZZLES, METHOD OF MANUFACTURE AND USE THEREOF

FIELD

The present disclosure relates to flow control devices, methods of manufacturing said flow control devices and methods of using the same.

BACKGROUND

Flow control devices are downhole tools designed to either inject multiphase products from a tubing into a formation, or to produce multiphase products from the formation into the tubing. In the case of Steam Assisted Gravity Drainage (SAGD), oil well pairs consist of an outflow control device (OCD) on a tubing of an injection well, and an inflow control device (ICD) on a tubing of a producing well of the pair. The injection well is typically the upper well of the pair, which injects steam into the formation using OCD nozzles. The producing well is the lower well of the pair which receives the producing oil from the formation and allows it to enter a production tubing through the ICD nozzles. The upper injection well will continuously inject steam, while the lower producing well will continuously produce oil.

During operation of a SAGD well pair, steam sometimes can break through the formation and into the lower, producing well. This will cause steam to enter the lower producing well and drastically reduce oil production through the producing well. Inflow flow control devices are used in such cases to flash the steam into liquid water form and thus allow for continued production of the oil.

Inflow flow control device/nozzles are typically sized with this flashing as the main design focus, with significantly less attention given to other aspects of nozzle geometry. As such, when flow control devices/nozzles are installed into the well tubing, they can often either protrude into the inner bore of the tubing, thereby reducing the inside diameter (ID) and flow capacity in the tubing, or they often extend out of the outside diameter (OD) of the tubing, requiring more clearance of the wellbore to accommodate such tubing. Both these sizing issues can reduce production capabilities and increase drilling costs.

Traditional nozzles are accommodated by cutting an opening into the wall of the tubing that is as large as the nozzle. The torsional and tensile strength of a tubing cut in such a manner is at least somewhat compromised.

One example of a traditional flow control device/nozzle can be seen in Canadian Patent Publication Number 3,074,488 published Mar. 7, 2019.

In Cyclical Steam Stimulation (CSS), which is carried out on a casing string, a single well is used for alternating/cycling steps of steam injection into the formation and oil production from the formation. In such operations a single flow control device is needed for both OCD (steam injection, or outflow) and ICD (oil production, or inflow) operations. These nozzles can be run on the casing string itself, directly against the formation, typically covered by some form of sand screen or sand control. In CSS operations, steam is injected at a first stage, usually at pressures and flowrates higher than used in SAGD, and then the formation is produced. Unlike SAGD, steam is not continuously injected.

Erosion, corrosion, and scaling are common problems found when using flow control devices/nozzles. These problems occur more often in the case of ICD nozzles and dual nozzles used in CSS, than in the case of the OCD nozzles. This is because ICD and dual nozzles are subject to more multiphase fluids as well as abrasive formation sands and chemicals. Hardened materials such as stainless steel or tungsten carbide are thus often required for manufacturing the flow control device/nozzles. Tungsten carbide cannot be machined, and while it can be molded, molding presents a number of challenges and limitations for producing complex geometries and shapes.

Steam injected from an injection well of a SAGD well pair needs to be kept at a high temperature and at generally high speed to penetrate the formation and stimulate hydrocarbon production. In traditional nozzles, having a straight bore, steam temperature has been seen to drop by as much as 50° C., leading to less efficient heating of the formation, and in turn, a higher steam-to-oil ratio required to achieve desired stimulation.

The shape of flow control devices/nozzles require a bend in the inner bore, to redirect fluid between the outside of the tubing and the inside of the tubing. To create this bend, two parts of the flow control device/nozzle are typically cast or molded separately with each part having a straight inner bore section at a particular angle. The two parts are then connected to one another and the two straight inner bore sections meet at an elbow. Multiple nozzle parts can lead to additional costs and also to more chance of failure. The connection point of the two nozzle parts is also often the source of leaks.

Canadian Patent No. 2,871,354 describes a flow restriction device for controlling flow of a fluid into a wellbore tubular from a production zone. The device comprises a housing and at least one divergent passageway, wherein the average angle of divergence in a divergent section of the passageway is between 2° and 40°. Fluid is directed from the production zone, through the divergent passageway and into the wellbore. Also described is a flow restriction device in which the discharged flow is aligned at an angle of between 0° and 60° of the direction of flow within the wellbore tubular. The flow restriction device is used to control distributed fluid flow into a wellbore tubular.

In traditional 2-piece nozzles, the transition from inlet opening to outlet opening is more commonly an angular bend or elbow. The angular bend or elbow and the resulting sudden change in direction of flowing fluids in traditional nozzles can lead to increased wear and erosion of the nozzle.

SUMMARY

In a first embodiment, an inflow control nozzle is provided for use with a tubing. The nozzle includes a one-piece, 3D printed body, the body including a fluid inlet in communication with an outside of the tubing said inlet having an oval cross section; a fluid outlet in communication with an inside of the tubing; and an inner bore connecting the fluid inlet to the fluid outlet, said inner bore including a venturi restriction. The inner bore comprises a flared profile from the fluid inlet to the venturi restriction, and a flared and curved profile from the venturi restriction to the fluid outlet, said curved profile being free of angular bends or sharp direction change.

An apparatus is also provided for controlling flow of fluids from a subterranean formation into a tubing or casing, the tubing or casing composed of multiple sections connected to one another by couplings. The apparatus includes a profile formed in a wall of a section of tubing or casing, said profile including a limited opening through the tubing or casing wall; and the inflow control nozzle described above, insertable into the tubing profile. The limited opening of the profile is limited in size to be equal to a size of a geometry of a fluid outlet section of the nozzle and wherein an outer diameter of the section of tubing or casing with the nozzle inserted therein is approximately similar to or less than an outer diameter of the coupling.

In a second embodiment, an outflow control nozzle is provided for use with a tubing. The nozzle includes a one-piece, 3D printed body, the body including a fluid inlet in communication with an inside of the tubing; one ore more fluid outlets in communication with an outside of the tubing said outlets each having an oval cross section; and an inner bore connecting the fluid inlet to each of the one or more fluid outlets, each of said inner bores including a venturi restriction. The inner bore comprises a flared and curved profile from the fluid inlet to the venturi restriction, and a flared profile from the venturi restriction to the fluid outlet, said curved profile being free of angular bends or sharp direction change.

An apparatus is further provided for controlling outflow of fluids from a tubing into a subterranean formation, the tubing composed of multiple tubing sections. The apparatus includes a mandrel threadably connectable between tubing sections, the mandrel having one or more recesses formed in a wall of mandrel, said recesses including a limited opening through the mandrel wall; and the outflow control nozzle as described above, insertable into each recess of the mandrel. The limited opening of the tubing profile is limited in size to be equal to a size of the fluid inlet of the nozzle.

In a third embodiment an inflow-outflow control nozzle is provided for use with a casing. The nozzle includes a one-piece, 3D printed body, the body including a first port in communication with an outside of the tubing said first port having an oval cross section; a second port in communication with an inside of the tubing; and an inner bore connecting the first port to the second port, said inner bore including a venturi restriction. The inner bore comprises a reverse flared profile from the first port to the venturi restriction, and a flared and curved profile from the venturi restriction to the second port, said curved profile being free of angular bends or sharp direction change.

An apparatus is further provided for controlling flow of fluids between an inside diameter of a casing and a subterranean formation, the casing composed of multiple casing joints connected to one another by couplings. The apparatus includes a profile formed in a wall of a joint of casing, said profile including a limited opening through the casing wall; and the inflow-outflow control nozzle as described above, insertable into the profile. The limited opening of the casing profile is limited in size to be equal to a size of the second port of the nozzle and wherein an outer diameter of the joint of casing with the nozzle inserted therein is approximately similar to or less than an outer diameter of the coupling.

It is to be understood that other aspects of the present disclosure will become readily apparent to those skilled in the art from the following detailed description, wherein various embodiments of the disclosure are shown and described by way of illustration. As will be realized, the disclosure is capable of other and different embodiments and its several details are capable of modification in various other respects, all without departing from the spirit and scope of the present disclosure. Accordingly, the drawings and detailed description are to be regarded as illustrative in nature and not as restrictive.

BRIEF DESCRIPTION OF THE DRAWINGS

A further, detailed, description of the disclosure, briefly described above, will follow by reference to the following drawings of specific embodiments of the disclosure. The drawings depict only typical embodiments of the disclosure and are therefore not to be considered limiting of its scope. In the drawings:

FIG. 1A is an isometric view of a first embodiment of an inflow nozzle of the present disclosure;

FIG. 1B is a top plan view of the inflow nozzle of FIG. 1A;

FIG. 1C is a side cross-sectional view of the inflow nozzle of FIG. 1A;

FIG. 1D is a bottom partial cross-sectional view of the inflow nozzle of FIG. 1A;

FIG. 1E is an end view of the inflow nozzle of FIG. 1A;

FIG. 1F is a cross-sectional end view of the inflow nozzle of FIG. 1A;

FIG. 2A is an isometric view of a second embodiment of an inflow nozzle of the present disclosure;

FIG. 2B is a top plan view of the inflow nozzle of FIG. 2A;

FIG. 2C is a side cross-sectional view of the inflow nozzle of FIG. 2A;

FIG. 2D is a bottom partial cross-sectional view of the inflow nozzle of FIG. 2A;

FIG. 2E is an end view of the inflow nozzle of FIG. 2A;

FIG. 2F is a cross-sectional end view of the inflow nozzle of FIG. 2A;

FIG. 4 is a side cross-sectional view of an inflow nozzle of the present disclosure as inserted in a tubing;

FIG. 7A is an isometric view of a second embodiment of an outflow nozzle of the present disclosure;

FIG. 7B is a side elevation view of the outflow nozzle of FIG. 7A;

FIG. 7C is a top plan view of the outflow nozzle of FIG. 7A;

FIG. 7D is a side cross-sectional view of the outflow nozzle of FIG. 7A, taken along line AA of FIG. 7C;

FIG. 7E is an end view of the outflow nozzle of FIG. 7A;

FIG. 7F is an end cross-sectional view of the outflow nozzle of FIG. 7A, taken along line BB of FIG. 7C;

FIG. 10 is a temperature contour diagram of a prior art nozzle;

FIG. 11 is a temperature contour diagram of one embodiment of a present outflow nozzle;

FIG. 12A is a side cross-sectional view of one embodiment of a casing deployed, inflow-outflow nozzle of the present disclosure;

FIG. 12B is an end cross sectional view of the inflow-outflow nozzle of FIG. 12A, taken along line B-B of FIG. 12A;

FIG. 12C is an end cross sectional view of the inflow-outflow nozzle of FIG. 12A, taken along line C-C of FIG. 12D;

FIG. 12D is a top plan view of the inflow-outflow nozzle of FIG. 12A;

FIG. 12E is an end elevation view of the inflow-outflow nozzle of FIG. 12A;

FIG. 12F is a top cross-sectional view of the inflow-outflow nozzle of FIG. 12A; and FIG. 12G is a perspective view of the inflow-outflow nozzle of FIG. 12A.

Figure 3F:
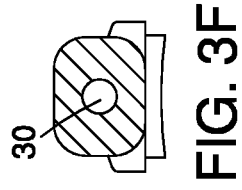
FIG. 3F is a cross-sectional end view of the inflow nozzle of FIG. 3A.
Figure 3B:
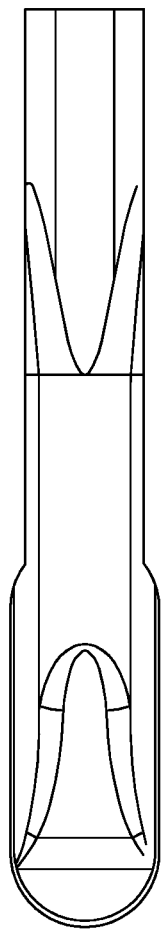
FIG. 3B is a top plan view of the inflow nozzle of FIG. 3A.
Figure 3C:
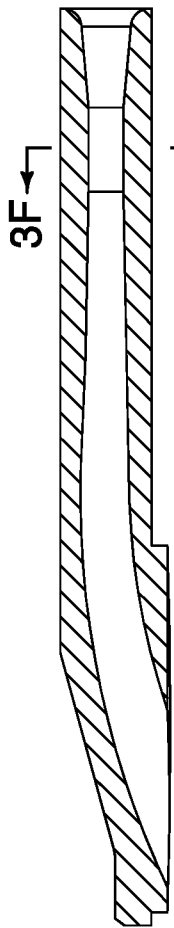
FIG. 3C is a side cross-sectional view of the inflow nozzle of FIG. 3A.
Figure 3D:
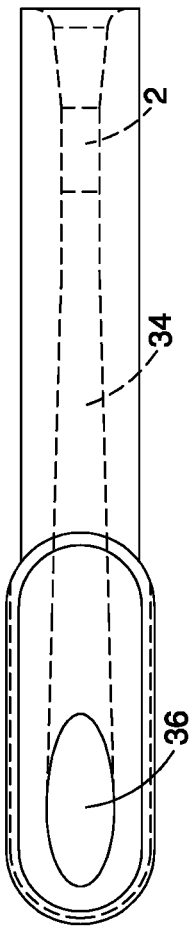
FIG. 3D is a bottom partial cross-sectional view of the inflow nozzle of FIG. 3A.
Figure 3A:
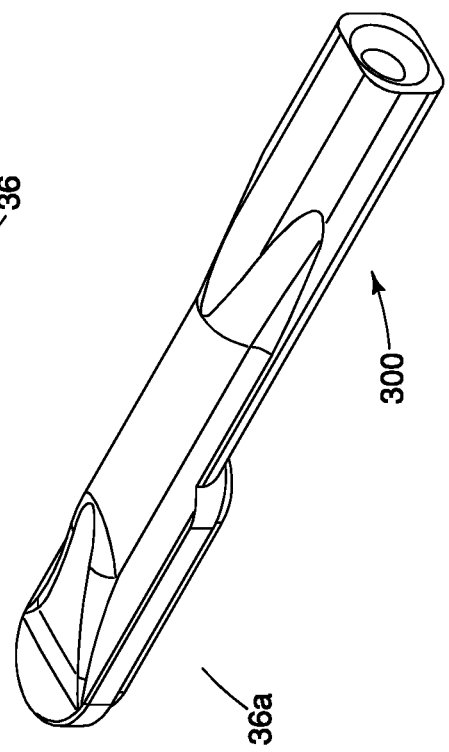
FIG. 3A is an isometric view of a third embodiment of an inflow nozzle of the present disclosure.
Figure 3E:
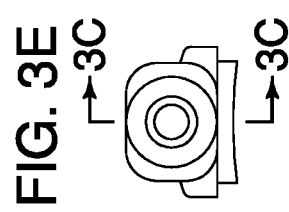
FIG. 3E is an end view of the inflow nozzle of FIG. 3A.

The drawings are not necessarily to scale and in some instances proportions may have been exaggerated in order to more clearly depict certain features.

DETAILED DESCRIPTION

The description that follows and the embodiments described therein are provided by way of illustration of an example, or examples, of particular embodiments of the principles of various aspects of the present disclosure. These examples are provided for the purposes of explanation, and not of limitation, of those principles and of the disclosure in its various aspects.

The present inflow flow control devices/nozzles are designed to eliminate steam entrance into the lower producing well of a SAGD well pair. The present outflow flow control device/nozzle can be used as an OCD nozzle on the upper, injecting well of a SAGD well pair. Alternatively, the present nozzles can be used as a nozzle handling both inflow and outflow, such as in the case of cyclic steam stimulation (CSS).

The present inflow flow control device/nozzles are designed to create a pressure drop to flash any steam that enters the nozzle, into a liquid state before exiting the flow control device/nozzle and entering the production tubing or casing. This allows other flow control device/nozzles in the lower producing well string to continue to produce oil. Steam breakthrough in the formation at a particular inflow flow control device/nozzle means that the particular location will produce only water.

With reference to the FIGS. 1A to 5, inflow embodiments of the present inflow flow control device/nozzle 100/200/300 have an inlet opening 10/20/30 at a first end for inlet of oil or steam. In a preferred embodiment illustrated in FIG. 1, the inlet opening 10 is of an oval cross section, which provides the cross-sectional area needed for flow through the nozzle 100 while presenting a smaller nozzle height profile 12. This low profile allows the nozzle 100/200/300 to sit more flushly on a tubing/casing 65 and reduces the overall outside diameter clearance required for the tubing/casing 65 with nozzles 100/200/300. In the embodiments for FIGS. 2 and 3, when a lower flow rate through the nozzle 200/300 is required and hence a smaller cross-sectional area of the inlet opening 20/30, then a circular cross section of the inlet opening 20/30 is also possible while maintaining a low profile of the nozzle 200/300.

The present nozzles have a venturi restriction 2 past the inlet opening 10/20/30, said venturi restriction 2 causing flashing of any steam into water. Between the inlet opening 10/20/30 and the venturi restriction the inner bore can continuously narrow in a reverse flare.

Downstream of the venturi restriction 2 the inner bore 14/24/34 can take on different profiles. As illustrated in FIGS. 1 and 2, the inner bore 14/24 can include a straight bore section 14a/24a downstream of the venturi restriction 2, and a gentle curve to a nozzle outlet 16/26/36. The embodiment of FIGS. 1 and 2 may be used in cases where a longer nozzle is required.

Alternatively, as illustrated in FIG. 3, the inner bore 34 can continuously flare and curve to the nozzle outlet 16/26/36 that is in communication with an inside of the tubing/casing 65. Both inner bore configurations 14/24 and 34 can be used in combination with oval inlet openings 10 or circular inlet openings 20/30.

The combination of any of the inlet opening profiles 10/20/30 with any of the inner bore profiles 14/24/34 are selected to create the required pressure drop to flash the steam, while also reducing pressure drop for oil production flow.

The present inflow flow control device/nozzle 100/200/300 low profile design means that when the nozzles are inserted into the tubing/casing 65 and covered by a sleeve 60, the outside diameter of the tubing/casing 65 with nozzles 100/200/300 and sleeve 60 is approximately similar to the outside diameter of box couplings 65a that connect tubing/casing sections together.

In some situations, a sand control screen is applied over the inflow nozzles 100/200/300 on the string, in which case the low profile of the nozzles 100/200/300 ensures that OD of the tubing/casing 65 with the nozzle 100/200/300 is approximately equal to or less than the diameter of the sand control screen. Slimmer outside diameter tubings/casings with nozzles 100/200/300 eliminate the need for drilling wider wellbores.

The present flow control device/nozzle can be made from any number of hardened materials including stainless steel and tungsten carbide and is preferably made from tungsten carbide. The present nozzles are more specifically manufactured by 3D printing. The present inventors have found that 3D printing is a suitable means for working with tungsten carbide and that 3D printing advantageously allows for more complex, customizable nozzle design that can be printed as a single piece nozzle.

The profile and geometry of the curved inner bore 14/24/34 of the present inflow nozzles 100/200/300 can be more precisely shaped by 3D printing. The present nozzles 100/200/300 provide a gentle continuous curved inner bore 14/24/34, unlike traditional 2-piece cast or molded nozzles having a sharp elbow or angular bend therein. The present single piece 3D printed nozzle 100/200/300 with curved inner bore 14/24/34 leads to less impinging of flowing fluids and in turn to less erosion and wear. The curved inner bore 14/24/34 of the present nozzles 100/200/300 also ensure laminar flow through the nozzle, avoiding undesirable eddies or turbulent flow.

In a preferred embodiment the angle of curvature presented by the inner bore 14/24/34 is about a continuous 3° angle from the venturi restriction 2 along a length of the inner bore and enters the tubing 65 at the outlet 16/26/36 at an approximate angel of 29°.

Figure 5:
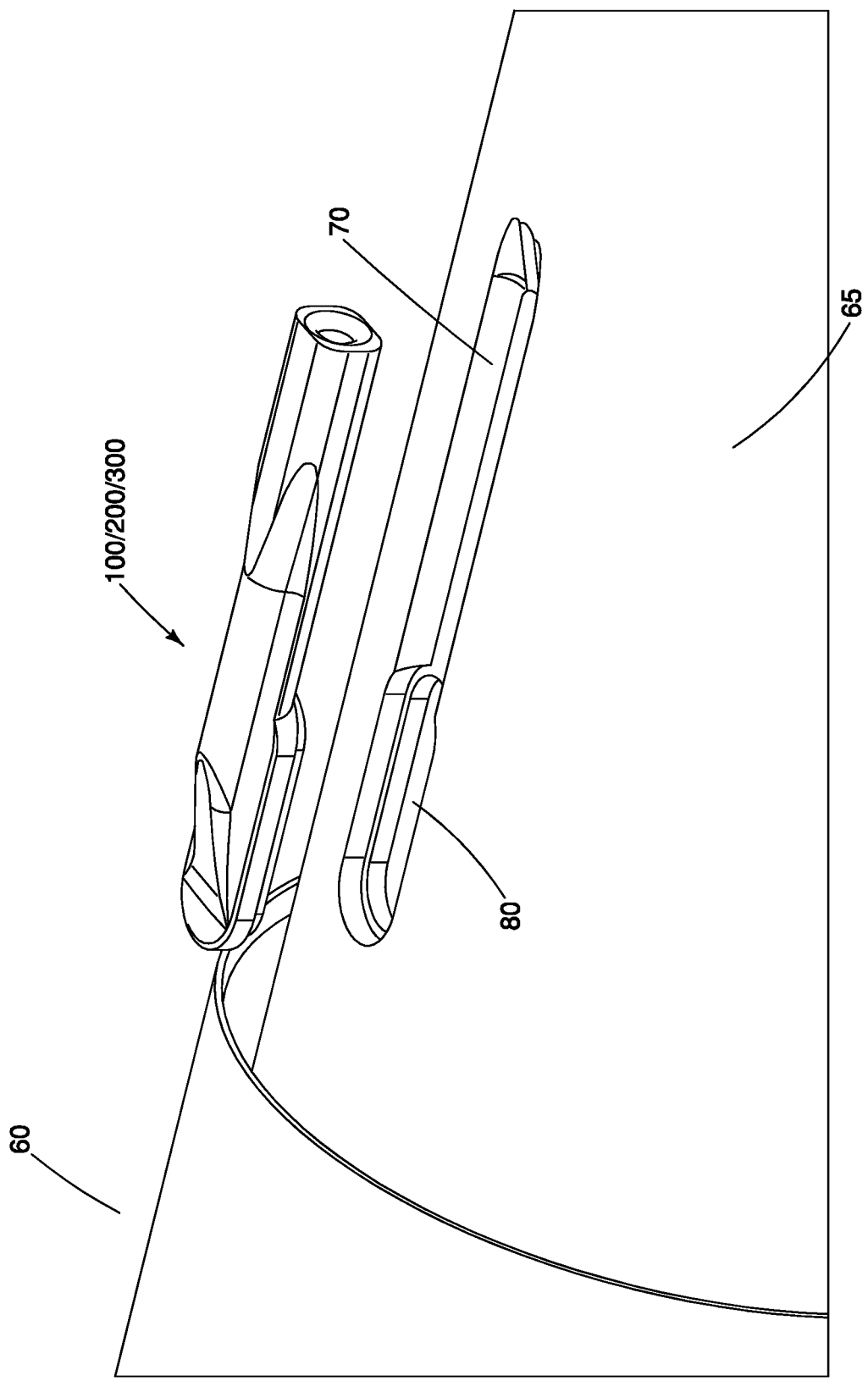
FIG. 5 is an isometric view of an inflow nozzle of the present disclosure and a tubing and sleeve for use with the nozzle.
Figure 6C:
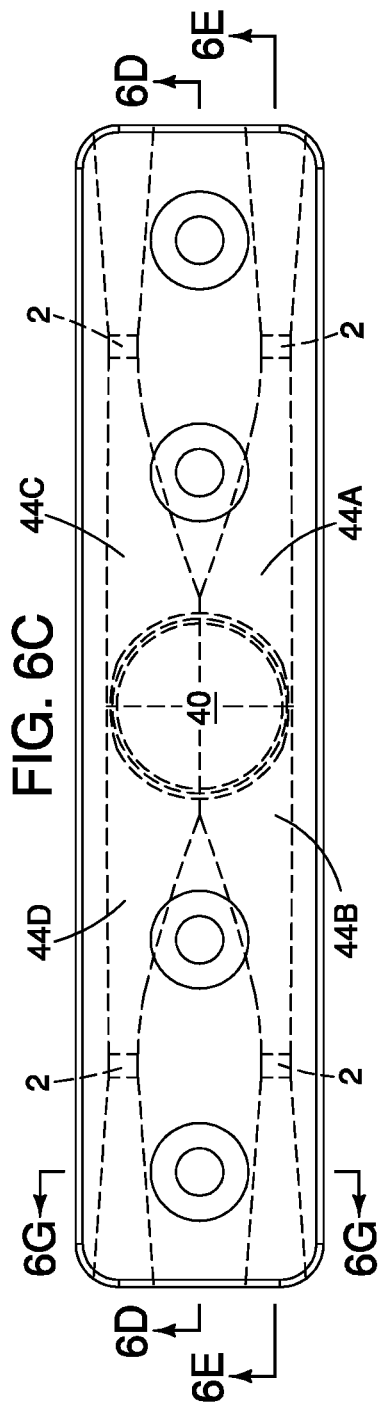
FIG. 6C is a top plan view of the outflow nozzle of FIG. 6A.
Figure 6B:
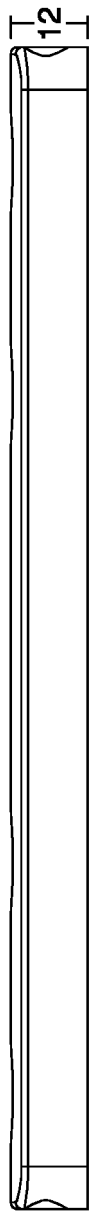
FIG. 6B is a side elevation view of the outflow nozzle of FIG. 6A.
Figure 6D:
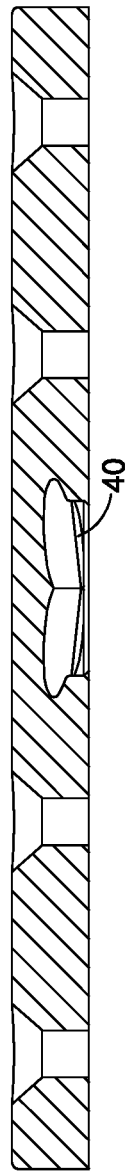
FIG. 6D is a first side cross-sectional view of the outflow nozzle of FIG. 6A, taken along line AA of FIG. 6C.
Figure 6E:
FIG. 6E is a second side cross-sectional view of the outflow nozzle of FIG. 6A, taken along line BB of FIG. 6C.
Figure 6F:
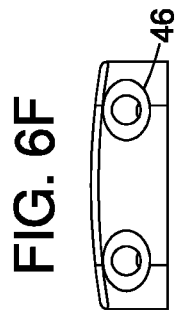
FIG. 6F is an end view of the outflow nozzle of FIG. 6A.
Figure 6G:
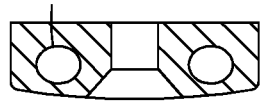
FIG. 6G is an end cross-sectional view of the outflow nozzle of FIG. 6A, taken along line CC of FIG. 6C.
Figure 6A:
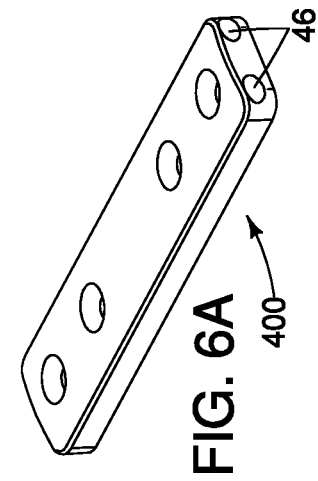
FIG. 6A is an isometric view of a first embodiment of an outflow nozzle of the present disclosure.

In use, the present low-profile inflow nozzles 100/200/300 are installed within the wall of a tubing 65. With reference to FIG. 5, one or more profiles 90 that resembles the shape of the nozzle can machined around a circumference of the wall of the tubing 65, but not through the tubing wall. In a preferred embodiment, the profiles 90 are machined to a depth of only half of a thickness of the wall of the tubing casing 65. These machined profiles 90 serve to lower the profile of the nozzles 100/200/300 as they set in the tubing 65 to be approximately similar to the OD of the box coupling 65a. The present nozzle design also does not protrude into the casing/tubing and does not reduce the inside diameter (ID) of the tubing 65. In an optional embodiment, the nozzle can be soldered, optionally by silver soldering, or adhered by epoxy into the profile 70.

Each profile 90 includes a limited opening 85 that extends into and through the wall of the casing/tubing 65, however this opening 85 is limited in size and shape to align with a geometry of an outlet section 16a/26a/36a of the nozzle when the nozzle 100/200/300 is inserted, to provide fluid communication from the inner bore 14/24/34 to an inside of the tubing 65. By thus limiting the size of opening 85 torsional and tensile strength of the tubing 65 is not compromised.

As mentioned, one or more profiles 90 can be machined around the circumference of a tubing 65. It is also possible to provide a separate mandrel (not shown) having profiles 90 and openings 85 machined around a circumference thereof, and the mandrel can then be threadably or otherwise connected in a casing or tubing string.

It is also possible to have, spaced along a length of tubing of casing run through the wellbore, multiple such mandrels or circumferences of profiles 90 fitted with nozzles 100/200/300. This allows production along an entire length of tubing string. A sliding sleeve can also be provided within the mandrel, located at the machined opening 85, said sleeve being selectively slidable to open or close the opening 85 to allow or block inflow into a particular nozzle.

With reference to the FIGS. 6A to 9, embodiments of an outflow flow control device are shown. Outflow control nozzles 400/500 can be used on a steam injection tubing of a SAGD well pair. Flow control nozzles 400/500 have an inlet opening 40/50 for inlet of steam from inside the tubing.

The inlet 40/50 is connected to one or more inner bore passages 44/54 depending on the outflow nozzle 400/500 design. With reference to FIGS. 6A to 6G, in one embodiment the inlet 40 is connected to four passages 44A/44B/44C/44D. With reference to FIGS. 7A to 7F, in another embodiment, inlet 50 is connected to two passages 54A/54B.

The inner bores 44/54 each comprise a venturi restriction 2, said venturi restriction 2 causing an increase in the speed of steam passing through the nozzle 400/500 and out to the formation. Inner bore passages 44/54 provide a continuous flare and curve from inlet 40/50 to the venturi restriction 2.

Downstream of the venturi restriction 2 the passages 44/54 continuously flare to nozzle outlets 46/56 that are in communication with the formation.

As illustrated in FIGS. 6A, 6F, 6G, 7A, 7E and 7F, the outflow nozzle outlets 46/56 are of an oval cross section, which provides the cross-sectional area needed for flow through the nozzle 400/500 while presenting a smaller nozzle height profile 12. This low profile allows the nozzle 400/500 to sit flatter and more flushly on a tubing 65 and reduces the overall outside diameter clearance required for the tubing 65 with nozzles 400/500.

The gradually flared inner passage bore 44/55 downstream of the venturi restriction 2 has been surprisingly found to show a recovery in steam temperature by the time the steam exits outlets 46/56, while maintaining sufficient steam flow speed.

FIG. 10 illustrates the temperature contour of a prior art nozzle design in which the inner bore passage is straight throughout, but with choked flow, imitating a venturi restriction. Temperature of the steam is seen to decrease significantly along the passage to the outlets. By contrast, FIG. 11 illustrates one embodiment of the present outflow control device nozzle 400, in which the flared shape and profile of the inner bore passages can be seen to cause an increase in temperature after the restriction, such that temperature of the steam is returned almost to that at which it entered the nozzle.

The present flow control device/nozzle 400/500 low profile design means that when the nozzles are inserted into the tubing 65, the outside diameter of the tubing 65 with nozzles 400/500 is approximately similar to the outside diameter of box couplings 65a that connect tubing sections together. Slimmer outside diameter tubings with nozzles 400/500 eliminate the need for drilling wider wellbores.

The profile and geometry of the curved inner bore passage 44/54 of the present outflow nozzles 400/500 can be more precisely shaped by 3D printing. The present outflow nozzles 400/500 provide a gentle continuous flared and curved inner bore 44/54, unlike traditional 2-piece cast or molded nozzles having a sharp elbow or angular bend therein. The present single piece 3D printed nozzle 400/500 with curved and flared inner bore 44/54 leads to higher steam temperature at the nozzle outlets 46/56 and retains suitable steam flow speed.

Figure 8A:
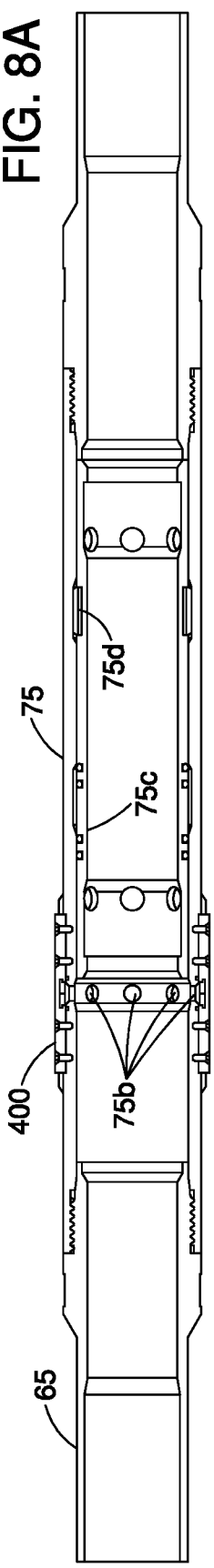
FIG. 8A is a side cross-sectional view of the outflow nozzles of FIG. 6A, as installed on a tubing and sleeve.
Figure 9:
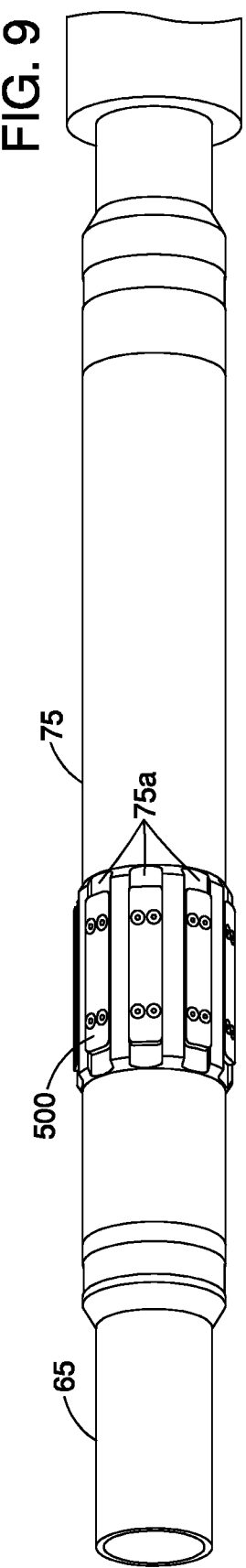
FIG. 9 is a side elevation view of the outflow nozzles of FIG. 7a as installed on a tubing and sleeve.
Figure 8B:
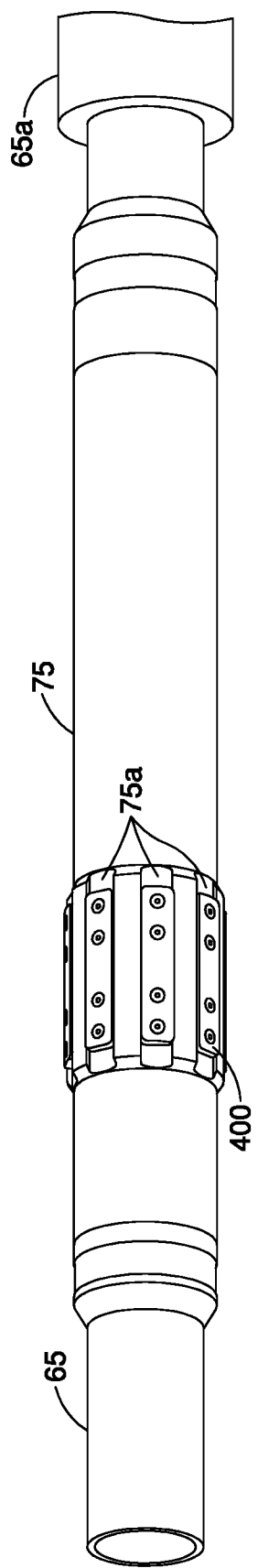
FIG. 8B is a side elevation view of the arrangement of FIG. 8A.

In use, the present low-profile outflow nozzles 400/500 are installed within the wall of a tubing 65. With reference to FIGS. 8a, 8b and 9, a mandrel 75 can be threaded into the tubing 65, the mandrel having one or more recesses 75a each recess 75a being shaped to receive a nozzle 400/500. The present nozzle design also does not protrude into the casing/tubing and does not reduce the inside diameter (ID) of the tubing 65.

The recesses 75a on mandrel 75 do not extend into the ID. But each recess 75a includes a limited opening 75b that extends into and through the wall of the mandrel 75, and these openings 75b are limited in size and shape to align with nozzle inlet 40/50 when the nozzle 400/500 is inserted, to provide fluid communication between an inside of the mandrel 75 and tubing 65, and the inner bore passage 44/54 of the nozzle 400/500. By thus limiting the size of openings 75b to only that of nozzle inlet 40/50, torsional and tensile strength of the mandrel 75 and the tubing 65 to which it is threaded, are not compromised. Further optionally an internal sliding sleeve 75c with a detent 75d may be present on the ID of mandrel 75, associated with each of the openings 75b, to selectively open and close openings 75b to allow or prevent fluid communication through a particular nozzle 400/500.

It is also possible to have, spaced along a length of tubing run through the wellbore, multiple such mandrels 75 fitted with nozzles 400/500. This allows stem injection along an entire length of tubing string.

In some cases, it may be desirable to optimize stem injection along the tubing string. In such cases it possible to fit a mandrel 75 that is farthest from the well head ("toe end") with a first lowest number of outflow nozzles 400/500, and then to fit a mandrel 75 closest to the well head (heel end) with a second, highest number of outflow nozzles 400/500. Mandrels 75 in between can have gradually decreasing numbers of nozzles from heel end to toe end.

In some cases, the outflow nozzles 400/500 are casing deployed, in which case one nozzle 400/500 is installed per joint of casing. Outflow nozzles 400/500 having the smallest outlets 46/56 are located at a heel end of the casing string and outflow nozzles 400/500 having the largest outlets 46/56 are located at the toe end of the casing string.

With reference to FIGS. 12A to 12G an embodiment of a combination inflow-outflow (IOCD) nozzle 600 is shown, for use in casing deployed applications such as CSS operations. The IOCD nozzle 600 shares a number of similarities in configuration to inflow nozzles 100/200/300. The nozzle 600 includes have a first port 60 at a first end for exit of steam during an injection stage and then for inlet of oil during a production stage. Preferably, the first port 60 is of an oval cross section, which provides the cross-sectional area needed for flow through the nozzle 600 while presenting a smaller nozzle height profile 62. This low profile allows the nozzle 600 to sit more flushly and reduces the overall outside diameter clearance required for a casing with nozzles 600.

The present nozzles 600 have a venturi restriction 2 past the first port 60, said venturi restriction 2. The venturi restriction serves to Increase velocity of steam in an outflow mode of operation, which still recovering steam temperature at the first port 60. The shape of the venturi restriction 2 is preferably designed as an oval, similar to the shape of first port 60, again, to provide needed cross-sectional area, while still presenting a low height profile of the overall nozzle 62.

From the first port 60 to the venturi restriction 2, a first inner bore section 63 continuously narrows in a reverse flare to the venturi restriction 2. The degree of the reverse flare of first inner bore section 63 can be selected to create the required steam injection or production flow.

On another side of the venturi restriction 2 a second inner bore section 64 of the nozzle 600 can continuously flare and curve to a second port 66 that is in communication with an inside of the casing. The second port 66 allows for steam from inside the casing to be injected into the formation at the injection stage of the CSS process, and for entry of oil into the casing during the production stage of the CSS process. The degree of flare and curve of the inner bore 64 can be selected to create the required steam injection or production flow. The degree of flare of the second inner bore section 64 can be equal to or different from the degree of reverse flare of the first inner bore section 63.

Both inner bore sections 64 and 66 maintain an oval shape in reverse flare or flare. This ensures that the nozzle maintains a lower profile even while providing needed cross-sectional area for steam or production flow.

The present IOCD nozzle 600 low profile design means that when the nozzles are inserted into the casing (not shown) and covered by a sand control sleeve (not shown), the outside diameter of the casing with nozzles 600 and sand control sleeve is approximately similar to the outside diameter of box couplings 65a that connect casing sections together. Slimmer outside diameter casings with nozzles 600 eliminate the need for drilling wider wellbores.

The present IOCD nozzle 600 can be made from any number of hardened materials including stainless steel and tungsten carbide and is preferably made from tungsten carbide. The present nozzles are more specifically manufactured by 3D printing. The present inventors have found that 3D printing is a suitable means for working with tungsten carbide and that 3D printing advantageously allows for more complex, customizable nozzle design that can be printed as a single piece nozzle.

The profile and geometry of the inner bore sections 63, 64 of the present nozzles 600 can be more precisely shaped by 3D printing. The present nozzles 600 provide a gentle continuous curved second inner bore section 64, unlike traditional 2-piece cast or molded nozzles having a sharp elbow or angular bend therein. The present single piece 3D printed nozzle 600 with reverse flared first inner bore section 63 and flared and curved second inner bore section 64 leads to less impinging of flowing fluids and in turn to less erosion and wear. The reverse flared first inner bore section 63 and flared and curved second inner bore section 64 of the present nozzles 600 also ensure laminar flow through the nozzle, avoiding undesirable eddies or turbulent flow.

In use, the present low-profile IOCD nozzles 600 are installed within the wall of a casing. A profile that resembles the shape of the nozzle 600 can preferably be machined into the casing, but not through the casing wall. In a preferred embodiment, the profile is machined to a depth of only half of a thickness of the wall of the casing. These machined profiles serve to lower the profile of the nozzles 600 as they set in the casing to be approximately similar to the OD of the box coupling 65a. The present nozzle design also does not protrude into the casing and does not reduce the inside diameter (ID) of the casing. In an optional embodiment, the nozzles 600 can be soldered, optionally by silver soldering, or adhered by epoxy into the profile.

Each profile includes a limited opening that extends into and through the wall of the casing, however this opening is limited in size and shape to align with a geometry of a second port section 66a of the nozzle when the nozzle 600 is inserted, to provide fluid communication from the inner bore sections 63 and 64 to an inside of the casing. By thus limiting the size of the profile opening, torsional and tensile strength of the casing is not compromised.

Preferably there is one profile and one nozzle 600 per joint of casing running through the wellbore, to allow steam injection and production along an entire length of casing string.

In some cases, it may be desirable to optimize steam injection and production flows along the casing string. In such cases it possible that the casing joint that is farthest from the well head ("toe end") is fitted with nozzles 600 that have first and second ports 60, 66 of a largest opening size, and that the nozzles on the joint closest to the well head (heel end) have first and second ports 6066 of a smallest opening size. Nozzles 600 on casing joints in between can have gradually increasing first and second port sizes from heel end to toe end.

The previous description of the disclosed embodiments is provided to enable any person skilled in the art to make or use the present disclosure. Various modifications to those embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

The invention claimed is:

1. An inflow control nozzle for use with a tubing, said nozzle comprising:
   a. a one-piece, 3D printed body, said body comprising:
      i. a production fluid inlet in communication with an outside of the tubing, said inlet having an oval cross section;
      ii. a production fluid outlet in communication with an inside of the tubing; and
      iii. an inner bore connecting the production fluid inlet to the production fluid outlet, said inner bore including a venturi restriction wherein said inner bore comprises a flared profile from the production fluid inlet to the venturi restriction, and a flared and curved profile from the venturi restriction to the production fluid outlet,
   wherein said curved profile is free of elbows, angular bends or sharp direction change.

2. An apparatus for controlling flow of production fluids from a subterranean formation into a tubing, said tubing composed of multiple tubing sections connected to one another by couplings; said apparatus comprising:
   a. profile formed through a part of a thickness of a wall of a section of tubing, said profile including a limited opening through a full thickness of the tubing wall; and
   b. the inflow control nozzle as claimed in claim 1, insertable into the tubing profile,
   wherein the limited opening of the tubing profile is limited in size to be equal to a geometry of the fluid outlet section of the nozzle and wherein an outer diameter of the section of tubing with the nozzle inserted therein is approximately equal to or less than an outer diameter of the coupling.

3. An outflow control nozzle for use with a tubing, said nozzle comprising:
   a. a one-piece, 3D printed body, said body comprising:
      i. an injection fluid inlet in communication with an inside of the tubing;
      ii. one ore more injection fluid outlets in communication with an outside of the tubing, said outlets each having an oval cross section; and
      iii. an inner bore connecting the injection fluid inlet to each of the one or more injection fluid outlets, each of said inner bores including a venturi restriction, wherein said inner bore comprises a flared and curved profile from the injection fluid inlet to the venturi restriction, and a flared profile from the venturi restriction to the injection fluid outlet,
   wherein said curved profile is free of elbows, angular bends or sharp direction change.

4. An apparatus for controlling outflow of injection fluids from a tubing into a subterranean formation, said tubing composed of multiple tubing sections; said apparatus comprising:
   a. a mandrel threadably connectable between tubing sections, the mandrel having one or more profiles formed through a part of a thickness of a wall of mandrel, said recesses including a limited opening through a full thickness of the wall; and
   b. the outflow control nozzle as claimed in claim 3, insertable into each recess of the mandrel,
   wherein the limited opening of the tubing profile is limited in size to be equal to a size of the injection fluid inlet of the nozzle.

5. An inflow-outflow control nozzle for use with a casing, said nozzle comprising:
   a. a one-piece, 3D printed body, said body comprising:
      i. a first port in communication with an outside of the tubing said first port having an oval cross section;
      ii. a second port in communication with an inside of the tubing; and
      iii. an inner bore connecting the first port to the second port, said inner bore including a venturi restriction wherein said inner bore comprises a reverse flared profile from the first port to the venturi restriction, and a flared and curved profile from the venturi restriction to the second port,
   wherein said curved profile is free of elbows, angular bends or sharp direction change.

6. An apparatus for controlling flow of fluids between an inside diameter of a casing and a subterranean formation, said casing composed of multiple casing joints connected to one another by couplings; said apparatus comprising:
   a. a profile formed through a part of a thickness of a wall of a joint of casing, said profile including a limited opening through a full thickness of the casing wall; and
   b. the inflow-outflow control nozzle as claimed in claim 5, insertable into the profile,
   wherein the limited opening of the casing profile is limited in size to be equal to a size of the second port of the nozzle and wherein an outer diameter of the joint of casing with the nozzle inserted therein is approximately equal to or less than an outer diameter of the coupling.

* * * * *